(12) United States Patent
Gerbing et al.

(10) Patent No.: US 7,897,232 B2
(45) Date of Patent: Mar. 1, 2011

(54) FRICTION LINING AND WEAR-RESISTANT PART

(75) Inventors: Tim-Florian Gerbing, Betzdorf (DE); Frank Steinhauer, Forst (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/748,006

(22) Filed: Mar. 26, 2010

(65) Prior Publication Data
US 2010/0209691 A1 Aug. 19, 2010

Related U.S. Application Data

(63) Continuation of application No. PCT/DE2008/001483, filed on Sep. 3, 2008.

(30) Foreign Application Priority Data

Sep. 27, 2007 (DE) .................. 10 2007 046 156

(51) Int. Cl.
*B32B 3/02* (2006.01)
(52) U.S. Cl. ............................ 428/66.2; 188/251 R

(58) Field of Classification Search ............... 428/293.1, 428/66.2; 188/251 R; 492/43, 44
See application file for complete search history.

(56) References Cited

U.S. PATENT DOCUMENTS

| | | | | |
|---|---|---|---|---|
| 3,520,390 | A * | 7/1970 | Bentz | 192/107 R |
| 5,266,395 | A * | 11/1993 | Yamashita et al. | 442/342 |
| 5,397,847 | A * | 3/1995 | Harris et al. | 525/432 |
| 5,780,152 | A * | 7/1998 | Ichiryu et al. | 428/357 |
| 7,332,196 | B2 * | 2/2008 | Kosuge et al. | 427/387 |
| 2007/0137819 | A1 | 6/2007 | Amma | |

FOREIGN PATENT DOCUMENTS

| | | |
|---|---|---|
| EP | 0 672 842 | 9/1995 |
| JP | 03 181627 | 8/1991 |

* cited by examiner

*Primary Examiner* — N. Edwards
(74) *Attorney, Agent, or Firm* — Lucas & Mercanti, LLP

(57) ABSTRACT

A wear-resistant and high temperature-resistant friction lining, in particular for a transport roller. The lining has a wear-resistant friction component embedded in a matrix and an additional component. The additional component is configured such that it is converted when exceeding a limit temperature while absorbing energy. Due to the endothermic reaction, a cooling effect takes place, which protects the friction lining. In particular, a so-called PBO fiber is used as the friction component.

9 Claims, 1 Drawing Sheet

FRICTION LINING AND WEAR-RESISTANT PART

This application is a continuation application of PCT/DE2008/001483 filed Sep. 3, 2008, which in turn claims the priority of DE 10 2007 046 056.0, filed Sep. 27, 2007, the priority of these applications is hereby claimed and these applications are incorporated by reference herein.

FIELD OF THE INVENTION

The invention relates to a friction lining and to a wear-resistant part.

BACKGROUND OF THE INVENTION

Parts which have to withstand high demands both in terms of the frictional loading and in terms of the thermal loading are used in many technical fields. By way of example, such high demands are often found in the case of transport applications in production plants, e.g. for transport rollers for conveying semifinished goods or products which are still warm or hot.

In addition to a metallic friction lining for transport means, polymer-based friction linings are also provided, in particular for transporting products/semi-finished goods where a high surface quality is important. Polymer-based friction linings such as these ensure that products in the aluminum or glass industry, for example, are transported without being destroyed or damaged. The friction properties can be improved by embedding wear-resistant friction components, for example aramid fibers, in the plastic.

However, there is the risk of thermal damage to the friction lining owing to high thermal loading, for example by the product which is still warm or hot.

The invention is based on the object of specifying a high-temperature-resistant friction lining and a wear-resistant part.

SUMMARY OF THE INVENTION

According to the invention, the object is achieved by a high-temperature-resistant friction lining comprising a matrix with a wear-resistant friction component embedded therein and also with an additional component, wherein the additional component is configured in such a way that it is converted when a limit temperature is exceeded, while absorbing energy.

In this context, "high-temperature-resistant" is understood to mean, in particular, a friction lining which is temperature-resistant and is not thermally damaged at temperatures which are, in particular, even above 150° C.

The particular advantage of the friction lining can be seen in the additional component since, when a limit temperature is exceeded, this has a quasi-cooling effect as it takes thermal energy from the surroundings. By way of example, the limit temperature is a fixedly defined temperature, above which chemical or else physical conversion of the additional component or of the additive is initiated owing to the thermal energy.

However, the limit temperature may also be a temperature range, for example as in the case of a chemical equilibrium reaction where the equilibrium shifts depending on the temperature.

The friction lining is preferably configured in the manner of a coating and applied to a base body. As an alternative to this, the friction lining forms a solid body which simultaneously forms the wear-resistant part.

The additional component is expediently configured in such a way that it undergoes an endothermic chemical reaction when the limit temperature is exceeded. An example of an endothermic chemical reaction of this type is the release of subcomponents, for example water of crystallization. As an alternative to the endothermic chemical reaction, the additional component may also be configured in such a way that an endothermic physical phase transition takes place.

In this context, the additional component is preferably a hydroxide, for example a metal hydroxide. The hydroxides used are preferably aluminum hydroxide and/or magnesium hydroxide. Decomposition occurs in both cases, at temperatures above a defined limit temperature, to form the aluminum oxide or, respectively, the magnesium oxide, with water being released. In the case of magnesium hydroxide, this takes place, for example, at temperatures above about 350° C. The consumption of thermal energy which takes place during this decomposition effectively cools the friction lining as a whole.

A further particular advantage of using aluminum hydroxide and/or magnesium hydroxide can be seen in their high surface area. As a result, any combustion products which may be produced, for example soot, can be bound by adsorption.

As an alternative to using hydroxides, it is also possible to use salts, in particular inorganic salts or metal salts. By way of example, use is made of borates.

Both aluminum hydroxide and magnesium hydroxide or the borates are agents which are also used as flame retardants.

In order to ensure that the surface of the friction lining has the smallest possible degree of abrasiveness, in one expedient refinement the matrix is a polymer matrix and, in particular, a thermosetting synthetic resin, preferably on the basis of phenolic resin.

In order to improve the friction resistance, in one expedient refinement the friction component provided is a wear-resistant fiber. This is preferably a polymer fiber, for example an aramid fiber, in particular a so-called para-aramid fiber (p-aramid fiber).

It has proved to be particularly advantageous to use a so-called PBO fiber, which is preferably used as the wear-resistant fiber. In this context, PBO is the chemical name for p-phenylene-2,6-benzobisoxazole. The particular advantage of the PBO fiber can be seen in its heat resistance which is considerably higher than that, for example, of the p-aramid fiber. It has a high durability during heating, a high flame resistance and also improved mechanical properties compared to the p-aramid fiber. As a whole, the PBO fiber is therefore particularly advantageously suitable for a high-temperature-resistant and wear-resistant friction lining. A friction lining configured in this way is particularly important, in particular, in combination with the additional component which reacts in an endothermic manner.

With respect to the easiest possible production, the fiber is preferably soaked in synthetic resin. Each individual fiber is therefore surrounded by synthetic resin. By way of example, the friction lining is formed by winding fibers, fiber bundles or yarns soaked in synthetic resin onto a metallic base body. As an alternative, it is also possible for fiber mats, nets or individual fibers which are only a few millimeters or centimeters long to be embedded in synthetic resin.

A friction lining of this type is expediently used for a transport component, in particular a transport roller. Here, the friction lining can be applied in the form of a coating to a base body of the component, or alternatively may also form an independent solid component.

Besides being used for transport parts, the friction lining may also be used for parts from other technical fields in other areas, for example for friction linings of brake devices, where high temperatures may occur during operation.

According to the invention, the object is also achieved by a wear-resistant part, in particular a transport part and preferably a transport roller, having such a friction lining. The advantages and preferred refinements mentioned in relation to the friction lining can correspondingly also be transferred to the component.

BRIEF DESCRIPTION OF THE FIGURE

The present invention will he more fully described in the following detailed description of the invention taken in conjunction with the accompanying drawing figure, in which:

The FIGURE is a perspective view of a winding device for producing a transport roller.

DETAILED DESCRIPTION OF THE INVENTION

Figure 1:
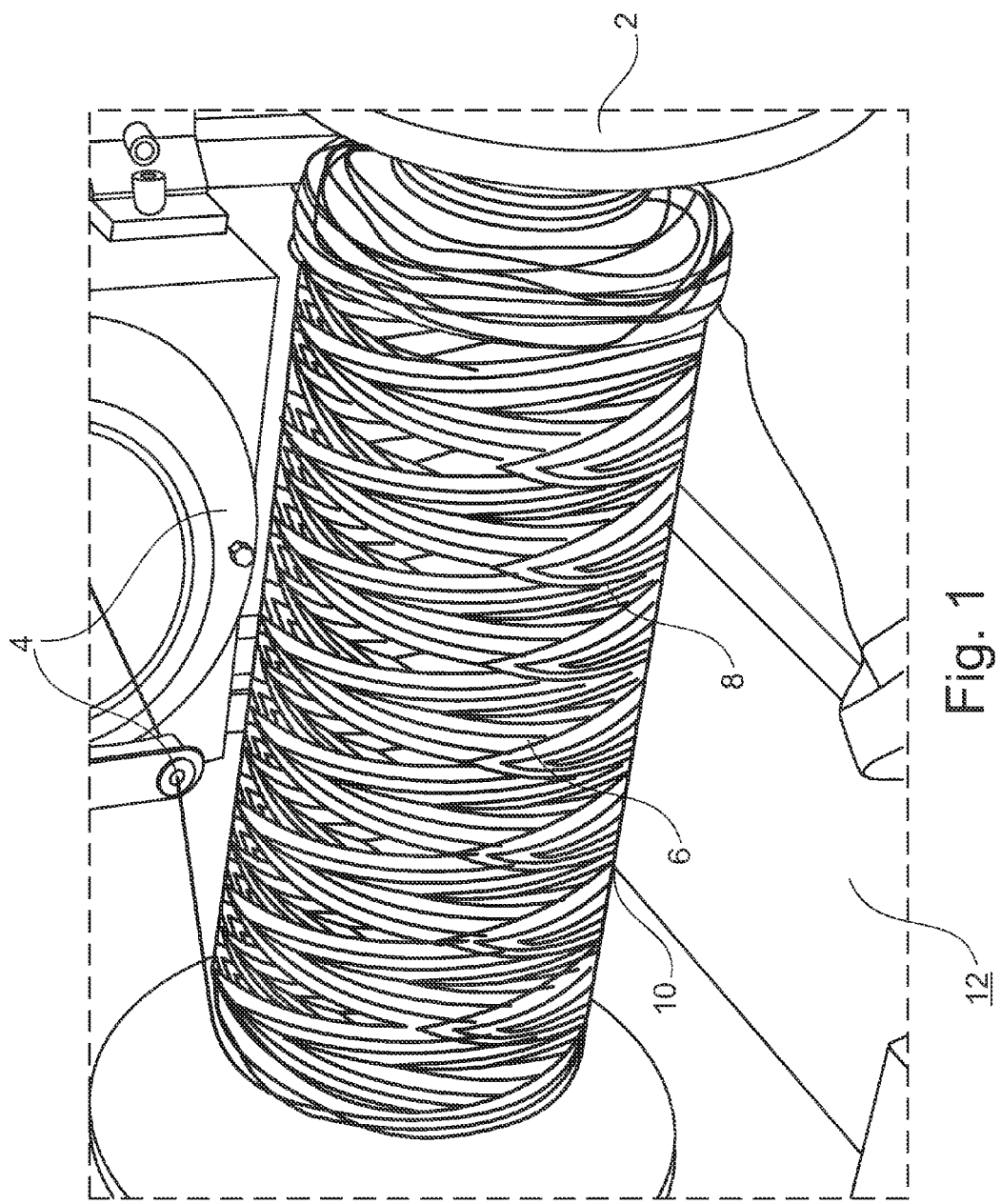

A cylindrical base body (which cannot be seen in more detail here) is pushed onto a rotatable spindle 2, and rotates during the winding operation. A PBO fiber strand 8 soaked in synthetic resin 6 is supplied from a supply device 4, and is wound onto the base body in the manner of a crosswinding, such that a friction lining 10 is formed on the base body. The base body together with the friction lining 10 applied thereto forms the transport roller 12. The height of the friction lining is, for example, several centimeters.

In a manner not shown in more detail here, aluminum hydroxide and/or magnesium hydroxide is introduced into the synthetic resin matrix 6 as the additional component. The proportion of these hydroxides in the overall friction lining (i.e. the proportion in relation to the synthetic resin 6 and fiber 8) is in the range of 18 to 48% by volume, and is preferably about 33% by volume.

In the exemplary embodiment, use is made of a PBO fiber strand 8 which consists of a multiplicity of individual PBO fibers which are twisted or stranded together, for example.

A friction lining of this type, which, in particular in combination, has the PBO fiber as the wear-resistant and high-temperature-resistant friction component and in addition aluminum hydroxide and/or magnesium hydroxide as the additional component, has a very good thermal durability. Overall, here the transport roller has a heat resistance of, for example, up to 500 to 600° C. If the transport roller briefly encounters higher temperatures, the friction lining 10 is not damaged. Instead, in this case the additional component is "activated", such that it has a cooling effect on its surroundings. In the case of aluminum hydroxide or magnesium hydroxide, this cooling effect is achieved by the release of water.

A particularly important factor of this friction lining is therefore the use of the additional component, namely in general terms an additional component which has a cooling effect on the friction lining when a specific temperature or a specific temperature range is reached or exceeded.

LIST OF REFERENCE NUMERALS

2 Spindle
4 Supply device
6 Synthetic resin
8 Fiber strand
10 Friction lining
12 Transport roller

The invention claimed is:

1. A friction lining, comprising:
a matrix having a wear-resistant friction component embedded in the matrix and the matrix having an additional component,
wherein the additional component absorbs thermal energy from external surroundings, cooling the friction lining, when a temperature limit is exceeded, wherein the friction component is a wear-resistant fiber coated by synthetic resin.

2. The friction lining of claim 1, wherein the additional component undergoes an endothermic chemical reaction when the temperature limit is exceeded.

3. The friction lining of claim 1, wherein the additional component is a hydroxide.

4. The friction lining of claim 1, wherein the additional component is aluminum hydroxide and/or magnesium hydroxide.

5. The friction lining of claim 1, wherein the matrix is a polymer matrix.

6. The friction lining of claim 5, wherein the matrix is a thermosetting synthetic resin.

7. The friction lining of claim 1, wherein the fiber is a PBO fiber.

8. The friction lining of claim 1, wherein the friction lining is formed by winding one or more fibers.

9. A wear-resistant part, comprising:
a friction lining having a matrix having a wear-resistant friction component embedded in the matrix and the matrix having an additional component,
wherein the additional component absorbs thermal energy from external surroundings, cooling the friction lining, when a temperature limit is exceeded,
wherein the friction component is a wear-resistant fiber coated by synthetic resin.

* * * * *